D. A. PRENDERGAST.
DAVIT HOOK.
APPLICATION FILED MAR. 30, 1911.
1,005,872.
Patented Oct. 17, 1911.
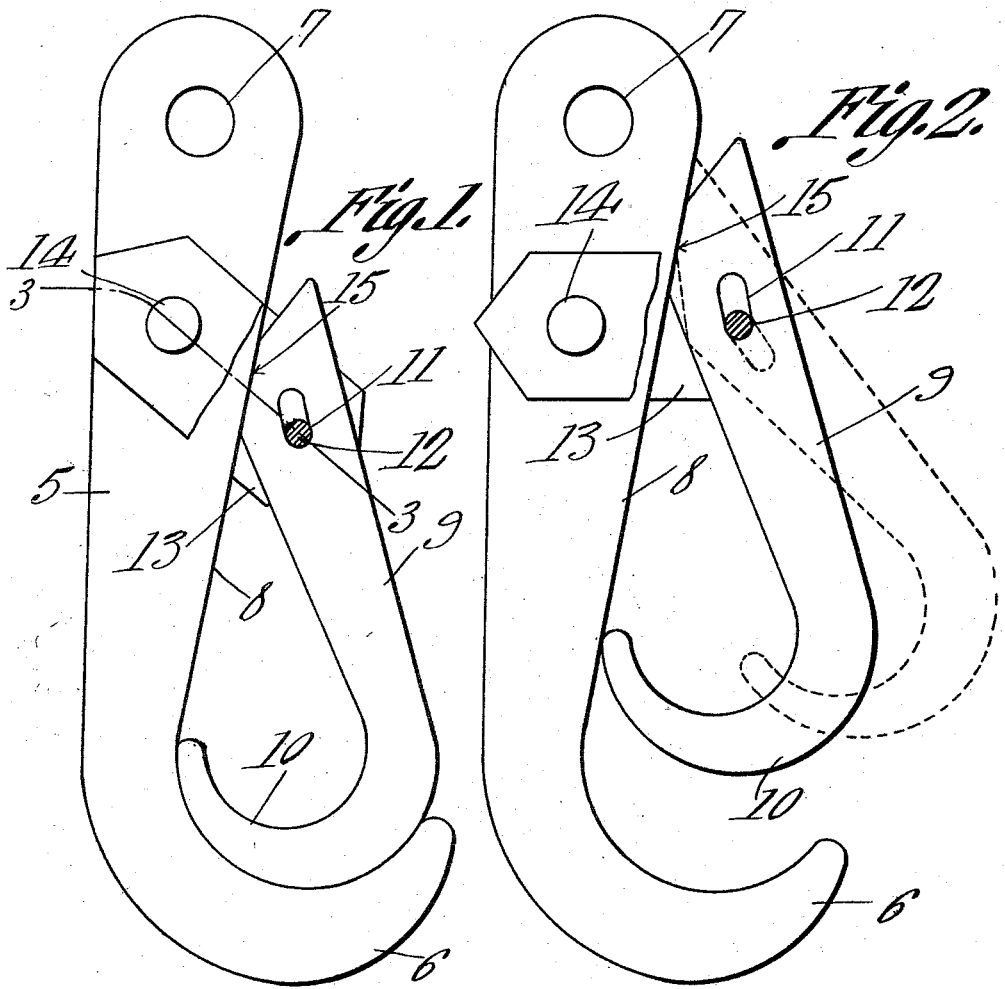
David A. Prendergast,
Inventor
Witnesses
by C. A. Snow & Co.
Attorneys

UNITED STATES PATENT OFFICE.

DAVID A. PRENDERGAST, OF BLAINE, WASHINGTON.

DAVIT-HOOK.

1,005,872. Specification of Letters Patent. Patented Oct. 17, 1911.

Application filed March 30, 1911. Serial No. 618,024.

*To all whom it may concern:*

Be it known that I, DAVID A. PRENDERGAST, a citizen of the United States, residing at Blaine, in the county of Whatcom and State of Washington, have invented a new and useful Davit-Hook, of which the following is a specification.

It is the object of the present invention to provide an improved form of davit hook of that type designed to be released by hand.

The primary aim of the invention is to provide a hook of this class which will not be liable to become disengaged from the rings at the bow and stern of the boat being lowered, when struck by a wave and momentarily lifted.

In the accompanying drawings:—Figure 1 is a view in side elevation, parts being broken away, of the hook embodying the present invention, the same being shown closed. Fig. 2 is a similar view showing in full lines, the hook partly open and in dotted lines, the hook fully open. Fig. 3 is a sectional view on the line 3—3 of Fig. 1.

In the drawings, the hook is illustrated as embodying a member including a shank 5 and a bill 6, the shank being preferably gradually broadened in the direction of its end opposite the end at which the bill 6 is formed, as is clearly shown in Figs. 1 and 2 and being formed at its said broadened end with an opening 7 for the engagement of a suspension chain or cable. One edge of this shank is specifically indicated in the drawings by the numeral 8 and will presently be referred to in connection with the description of the operation of the hook. There is also provided an auxiliary hook member including a shank 9 and a bill 10, the latter being embraced by the inner edge of the bill 6 of the member 5 when the hook is closed, as illustrated in Fig. 1 of the drawings. That end of the shank 9 of the auxiliary hook member opposite the end at which the bill 10 is formed, is formed with a slot 11 through which is fitted a pivot pin 12, the said pin being secured through the ends of spaced links 13. The links 13 are also pivoted as at 14 at their opposite ends, to the shank 5 of the first described member.

At its pivoted end, the shank 9 of the auxiliary hook member is formed with an edge portion 15 which extends at an obtuse angle to that edge of the shank which opposes the edge 8 of the shank 5 of the first described member of the hook and the distance between the pivots 12 and 14 is such that when the hook is in the dotted line position shown in Fig. 2 of the drawings, the edge portion 15 of the shank 9 will be sufficiently spaced from the edge 8 of the shank 5 to permit of the auxiliary member being swung outwardly from the first described hook member to about the position shown. However, when the auxiliary hook member is in the full line position shown in Fig. 1 or the full line position shown in Fig. 2, the edge portion 15 rests directly against the edge 8 of the shank 5 and outward swinging of the auxiliary hook member is effectually prevented. As a result, the hook is normally held closed and there is no tendency for the auxiliary member 9 to swing outwardly when the hook is momentarily relieved of the pull of the weight supported by it. It will be readily understood that the hook may be readily disengaged from the rings at the bow and stern of a boat by first moving the hook to dotted line position and then to the full line position shown in Fig. 2, the ring being worked over the extremity of the bill 10 as the auxiliary hook member is moved from one to the other of these positions.

What is claimed is:—

1. In a hook of the class described, a member including a shank and a bill, an auxiliary member also including a shank and a bill, the bill of the first mentioned member embracing the bill of the second mentioned member when the hook is closed, and a link pivotally connecting the shanks of the two members, the shank of the auxiliary member having a portion arranged to engage against one edge of the shank of the first mentioned member when the link is in one position whereby to hold the auxiliary member against swinging away from the first mentioned member.

2. In a hook of the class described, a member including a shank and a bill, an auxiliary member also including a shank and bill, the bill of the first mentioned member embracing the bill of the second mentioned member when the hook is closed, and a link pivoted to the shank of the first mentioned member near one end thereof and to the shank of the auxiliary member at one end thereof and connecting the two members, the auxiliary member being arranged at the said end of its shank to engage against one edge of the shank of the first mentioned member whereby to limit its swinging movement in a direction away from the said first mentioned member.

3. In a hook of the class described, a member including a shank and a bill, an auxiliary member also including a shank and a bill, the bill of the first mentioned member embracing the bill of the second mentioned member when the hook is closed, and a link pivotally and loosely connecting the shanks of the two members, the auxiliary member being movable bodily in the direction of length of the first mentioned member and away from the bill thereof and being movable upon its point of pivotal connection with the link.

4. In a hook of the class described, a member including a shank and a bill, an auxiliary member also including a shank and a bill, the bill of the first mentioned member embracing the bill of the second mentioned member when the hook is closed, and a link pivotally and loosely connecting the shanks of the two members, the auxiliary member being movable bodily in the direction of length of the first mentioned member and away from the bill thereof and being movable upon its point of pivotal connection with the link, the shank of the auxiliary member at its pivoted end being formed to engage against one edge of the shank of the first mentioned member whereby to limit the outward swinging movement of the said auxiliary member upon its said point of pivotal connection with the link.

In testimony that I claim the foregoing as my own, I have hereto affixed my signature in the presence of two witnesses.

DAVID A. PRENDERGAST.

Witnesses:
C. B. HOVEY,
FRANK FOX.

Copies of this patent may be obtained for five cents each, by addressing the "Commissioner of Patents, Washington, D. C."